April 12, 1932.   C. E. FURGASON   1,853,346
COMBINATION VENTILATOR
Filed May 30, 1930
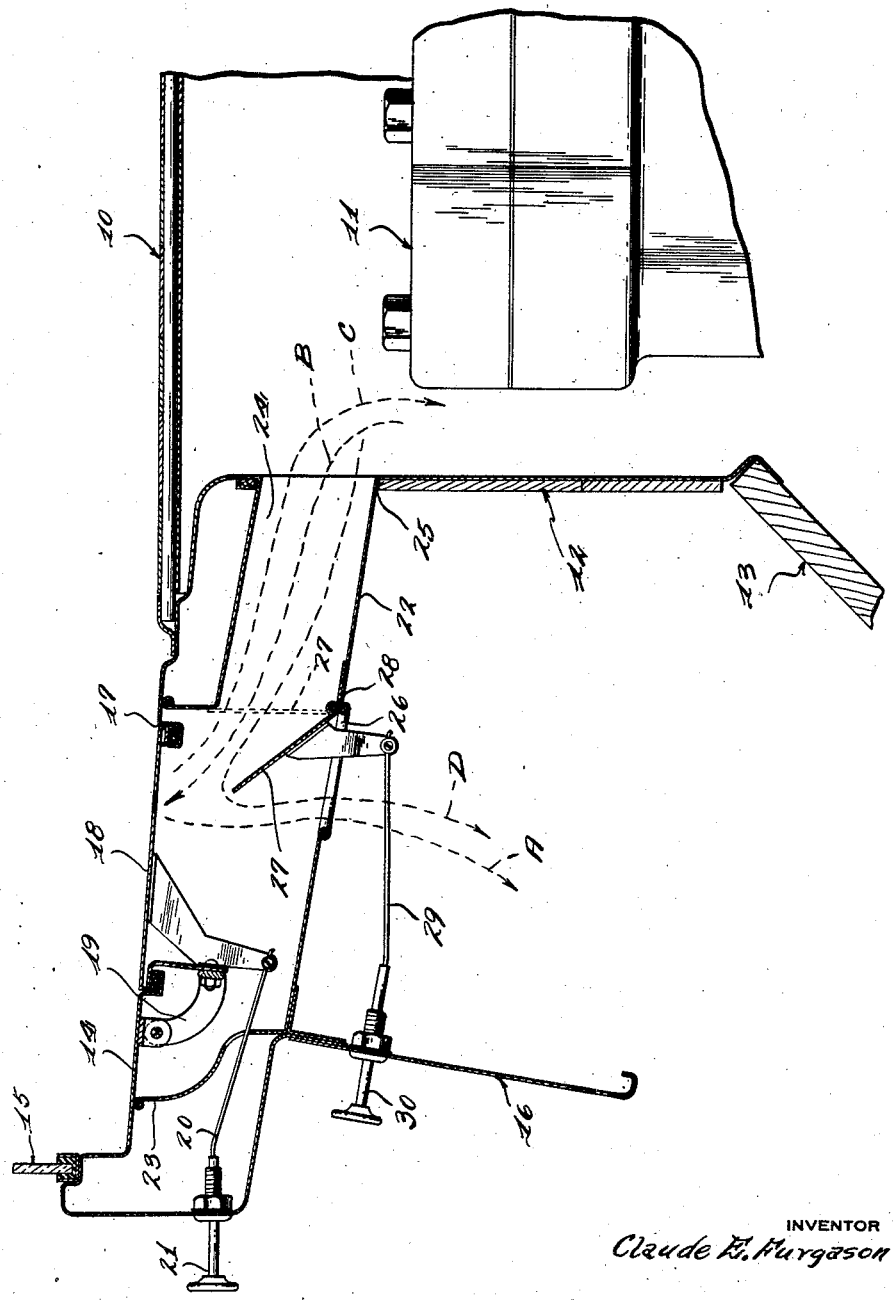
INVENTOR
Claude E. Furgason
BY
ATTORNEYS Patented Apr. 12, 1932

1,853,346

UNITED STATES PATENT OFFICE

CLAUDE E. FURGASON, OF LANSING, MICHIGAN, ASSIGNOR TO REO MOTOR CAR COMPANY, OF LANSING, MICHIGAN, A CORPORATION OF MICHIGAN

COMBINATION VENTILATOR

Application filed May 30, 1930. Serial No. 457,618.

This invention relates to ventilators and more particularly to a ventilating device or apparatus for use in connection with motor vehicles and the like.

The invention contemplates the provision of means capable of use in connection with the cowl ventilator usually employed in connection with motor vehicles and the like and also contemplates the provision of means whereby communication between the cowl ventilator opening and the chamber under the hood is provided through the dashboard of the vehicle whereby air may pass from one of these openings to the other and vice versa; together with an additional closure controlled opening, the closure of which is adjustable to control the passage of air between the aforesaid openings and from either or both of these openings to the closure controlled opening.

The several objects, advantages and novel details of construction of this invention will be made more apparent as this description proceeds, especially when considered in connection with the accompanying drawing wherein the figure is a fragmentary vertical sectional elevational view of a portion of a motor vehicle provided with my improved ventilating apparatus.

Referring now particularly to the drawing wherein like reference characters indicate like parts, it will be noted that there is fragmentarily illustrated the hood 10 of a motor vehicle which encloses the customary motor 11. The reference character 12 indicates the dashboard and the reference character 13 the toeboard, these latter parts being arranged rearwardly of the motor 11 and acting to close the rear end of the motor chamber from communication with the interior of the vehicle as is customary.

The reference character 14 indicates the customary cowl, 15 the windshield and 16 the instrument board or panel.

The cowl is provided with the usual cowl ventilating opening 17, this opening being closed by a closure plate or member 18 pivotally swingingly supported by the hinge member 19 and movable to various adjusted positions by means of adjusting rod 20 operable through handle 21.

The present invention contemplates the association with this ventilating opening 17 and closure plate 18 of a partition 22 having portions 23 engageable with the lower face of the cowl 14 and forming a conduit or passageway 24 which connects the cowl opening 17 with an opening 25 in the dashboard 12. Thus, the cowl opening 17 is connected to the motor or hood chamber, or in other words, to the space in front of the dashboard 12.

The lower portion or bottom of this conduit is provided with an opening 26 adapted to be closed by means of a closure member 27 hingedly supported as, for instance, at 28. This closure member may be adjusted to various positions and held thus adjusted by means of a rod or the like 29, through the medium of a handle 30 accessible together with the handle 21 from the driver's seat of the vehicle.

The operation of the ventilating apparatus herein described is as follows:

In the summer or warm weather, the ventilator closure 18 is adjusted to open position by the handle 21 and the adjustable closure 27 is adjusted through the medium of handle 30 to the dotted line position shown in the drawing. This causes fresh air, directed inwardly through the opening 17 by the closure member 18, to flow downwardly through the opening 26 substantially in the direction indicated by arrow A. This fresh air is thus directed under the instrument board and into the interior of the car to ventilate the same.

When the car is idling or traveling at a slow rate of speed, the motor heats up and under these conditions the ventilator closure 18 is opened and the adjustable closure 27 is moved to the position where it closes opening 26. This will permit the heat from under the hood to escape through the ventilator opening 17, the passage of this heated air being indicated by the arrow B.

When the vehicle is traveling fast, the air pressure above the hood increases and overcomes the air pressure from the fan arranged at the forward end of the hood chamber. Under these conditions air will flow inwardly through the cowl ventilator opening 17 and through the conduit 24 in the direction of arrow C and downwardly in front of the dashboard and thus under the toeboard and floorboards (not shown) to cool the same.

In winter this ventilating apparatus may be conveniently used as a heater for heating the interior of the vehicle and under these conditions the cowl ventilator closure 18 is adjusted to closed position as shown in the drawing and the adjustable closure 27 is adjusted half open or to substantially the position illustrated in the drawing. This allows warm air from the hood chamber to be forced by the fan rearwardly through the conduit 24 and around the closure 27 through the opening 26 into the interior of the vehicle, the path of this warm air being indicated substantially by the arrow D.

If the adjustable closure 27 is left adjusted to the position illustrated in the drawing and the cowl ventilator opening closure 18 is open, the incoming fresh air will be divided, part of the same passing over the adjustable closure 27 and through the opening 26 and into the interior of the car substantially as indicated by the dotted arrow A, while the remaining portion of this fresh air will be directed through the conduit 24 in the manner indicated by the arrow C and back of the dashboard and then under the toeboard and floor boards (not shown) to cool the same.

Obvious modifications and changes will suggest themselves to those skilled in this art and to this end reservation is made to make such changes as may come within the purview of the accompanying claims.

What I claim as my invention is:

1. In a motor vehicle, a cowl having a closure controlled opening therein, a dash provided with an opening therein, a conduit connecting said cowl and dash openings, an opening in said conduit, and a closure therefor adjustable to control the passage of air between said cowl and dash openings and from either of said openings to said conduit opening.

2. In a motor vehicle, the combination with a cowl ventilator, of a conduit means connecting the opening of said cowl ventilator to the space under the hood of the vehicle, said conduit being provided with an opening in its lower side, an adjustable closure for said opening, said closure being adjustable to direct the air from said cowl opening or from the space under said hood through the opening in said conduit.

3. In a motor vehicle, the combination with the cowl ventilator thereof, of means connecting the opening of said cowl ventilator with the space under the hood, and a closure controlled opening in said means, the closure being adjustable to control the passage of air between said cowl opening and hood chamber and from either thereof to the interior of the vehicle.

In testimony whereof I affix my signature.

CLAUDE E. FURGASON.